United States Patent [19]

Kafka et al.

[11] Patent Number: 4,896,326
[45] Date of Patent: Jan. 23, 1990

[54] PEAK POWER FLUCTUATIONS IN OPTICAL PULSE COMPRESSION

[75] Inventors: James D. Kafka; Thomas M. Baer, both of Mountain View, Calif.

[73] Assignee: Spectra-Physics, Inc., San Jose, Calif.

[21] Appl. No.: 152,171

[22] Filed: Feb. 3, 1988

[51] Int. Cl.⁴ .............................................. H01S 3/13
[52] U.S. Cl. ......................................... 372/31; 372/22
[58] Field of Search ................ 372/31, 93, 9, 18, 22, 372/13, 25, 29

[56]  References Cited

U.S. PATENT DOCUMENTS

| 3,586,997 | 6/1971 | Kinsel | 372/22 |
| 3,713,042 | 1/1973 | Kinsel | 372/18 |
| 4,221,960 | 9/1980 | Maeda et al. | 372/29 |
| 4,329,569 | 5/1982 | Chen | 372/29 |
| 4,635,263 | 1/1987 | Mollenauer | 372/18 |
| 4,646,308 | 2/1987 | Kafka et al. | 372/22 |
| 4,764,930 | 8/1988 | Bille et al. | 372/25 |

FOREIGN PATENT DOCUMENTS

| 0107331 | 6/1984 | Japan | 372/31 |
| 0196128 | 8/1986 | Japan | 372/31 |

Primary Examiner—Frank Gonzalez
Attorney, Agent, or Firm—Paul Davis

[57] ABSTRACT

Fluctuations in input intensity and pulsewidth affect the frequency doubled output pulse of a fiber grating optical pulse compressor in a compressed, continuous-wave, mode-locked Nd:YAG laser system. An optimized intensity servo system greatly reduces these fluctuations and results in as much as 50 dB noise reduction at low frequencies. Fluctuations in either input intensity or pulsewidth are corrected by changing the input intensity by means of the servo system.

14 Claims, 5 Drawing Sheets

PEAK POWER FLUCTUATIONS IN OPTICAL PULSE COMPRESSION

BACKGROUND OF THE INVENTION

This invention relates generally to optical pulse compression and more particularly to noise reduction in fiber grating pulse compressor laser systems.

Optical pulse compression has become a standard laboratory technique because it offers increased time resolution as well as increased peak powers. While the addition of a pulse compressor to a mode-locked source provides great advantage, the pulse to pulse stability is often degraded.

Optical pulse compression techniques have been applied to a variety of mode-locked laser sources. Early work dealt with compression of Nd:glass and Helium-Neon lasers. More recently, attention has been focussed on dye lasers and continuous wave (cw) mode-locked Nd:YAG lasers. U.S. Pat. No. 4,646,308 to J. D. Kafka and T. M. Baer is directed to a synchronously pumped dye laser using ultrashort pump pulses formed by pulse compressing the output of a Nd:YAG laser. The compressed dye laser systems have provided the shortest pulses generated as well as ultrashort tunable pulses.

The compressed cw mode-locked Nd:YAG laser has been used in several applications. In electro-optic sampling in GaAs circuits, short synchronized infrared and visible pulses are required. The visible pulse, obtained by frequency doubling, is used to launch an electrical signal and the infrared pulse is used to probe the fields generated in the GaAs substrate. The compressed and frequency doubled output has been used to pump a dye laser producing tunable 200 fsec pulses with high average power. This source has also been used to perform ultrafast luminescence spectroscopy using sum frequency generation.

While the average power into the pulse compressor varies by a few percent (rms, 500 KHz bandwidth) and the average power out varies the same amount, the second harmonic of the compressed pulses can have much larger fluctuations. Several possible sources of these fluctuations including laser beam pointing, motion of the fiber and changes in the output polarization have been eliminated. Therefore, the additional noise on the second harmonic of the compressed pulses is predominantly due to fluctuations in the intensity and pulsewidth of the input pulses.

SUMMARY OF THE INVENTION

Accordingly it is an object of the invention to provide method and apparatus for stabilizing the frequency doubled output of a compressed cw modelocked laser system.

It is also an object of the invention to provide method and apparatus for stabilizing the frequency doubled output pulse of a fiber grating optical pulse compressor from fluctuations in either input intensity or pulsewidth.

It is a further object of the invention to reduce fluctuations in a frequency doubled output of a compressed cw modelocked laser system caused by both input intensity and pulsewidth fluctuations.

The invention is a method and apparatus for reducing noise on the second harmonic of compressed pulses due to fluctuations in intensity and pulsewidth of the input pulses using control of only the input intensity. Pulses from a cw modelocked laser source are passed through a fiber grating compressor whose output is passed through a frequency doubler to produce frequency doubled compressed pulses. A servo system measures the intensity of the frequency doubled compressed pulses, produces a control signal related to the measured intensity, produces a drive signal in response to the control signal, and adjusts the intensity of the laser source in response to the drive signal. The servo system includes intensity measurement means for measuring the frequency doubled compressed pulse intensity, controller means connected to the intensity measurement means, and intensity adjustment means connected to the controller means for adjusting the intensity of pulses from the laser source. Although the frequency doubled output of the compressor is affected by both the laser source intensity and pulsewidth, fluctuations due to either input intensity or pulsewidth are corrected by controlling only the input intensity.

DETAILED DESCRIPTION OF THE PREFERRED EMBODIMENTS

Figure 1:
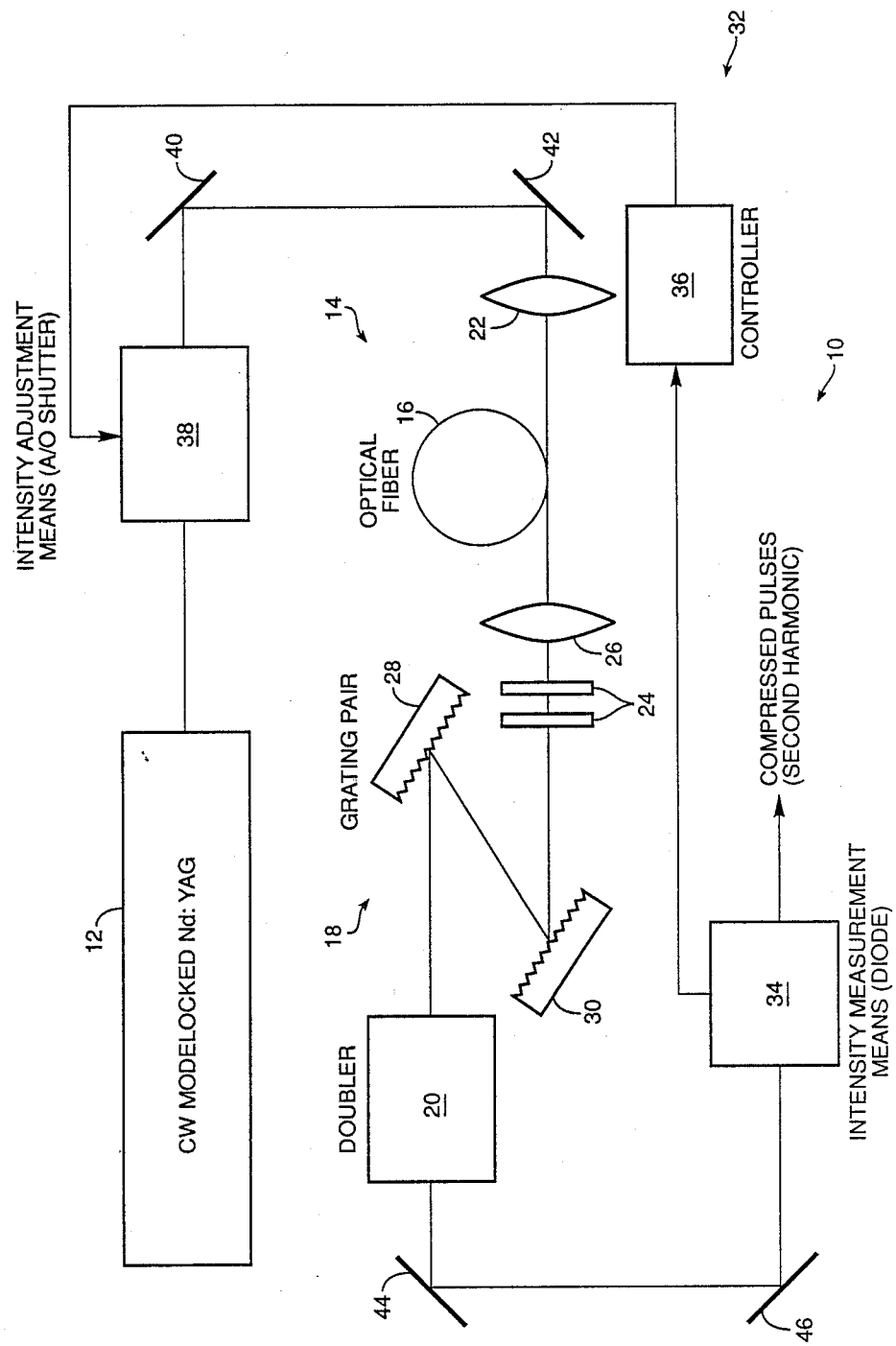
FIG. 1 is a schematic view of a laser/pulse compressor/frequency doubler with input intensity adjustment servo system.

A preferred embodiment of a laser/compressor/doubler system 10 with reduced peak power fluctuations, in accordance with the invention, is shown in FIG. 1. The laser 12 is preferably a cw mode-locked Nd:YAG laser and the following pulse compressor 14 uses a single mode optical fiber 16 and a grating pair 18. Following the compressor 14 is a frequency doubling crystal 20 for generating the second harmonic of the compressed pulses. Typically, the cw mode-locked Nd:YAG laser produces pulses of 80 psec duration at 82 MHz and the average power from the laser is approximately 8 W corresponding to a peak power of about a kilowatt. The pulses from laser 12 are coupled by lens 22 into a single mode fiber 16 that is not polarization preserving with a typical coupling efficiency of between 60% and 70%. Upon exiting the fiber the polarization is reconstructed using a pair 24 of quarter wave plates, and the pulses are then directed by lens 26 to a double pass grating pair 18 which comprises gratings 28, 30 in a spaced parallel relationship. The compressed pulses have a pulsewidth of about 4 psec and an average power of 3 W. These pulses are then frequency doubled in doubler 20, e.g., a 5 mm crystal of KTP, in order to produce 1 W of average power at 532 nm. Mirrors 40, 42, 44, 46 are used to change beam propagation direction, i.e. fold the optical configuration, as appropriate.

The stabilization or servo system 32 of laser system 10 consists of intensity measurement means 34 for measuring the frequency doubled intensity of pulses from doubler 20, a controller 36 which receives an input signal from intensity measurement means 34, and intensity adjustment means 38 which receives a drive signal from controller 36. Intensity adjustment means 38 is typically an acousto-optic modulator placed between the laser 12 and the compressor 14. With this configuration the servo system 32 adjusts the input intensity to the compressor 14 in order to keep the frequency doubled (green) output constant. Though other types of noise reduction schemes are possible, this particular servo design appears to optimize overall throughput of the system.

Figure 2:
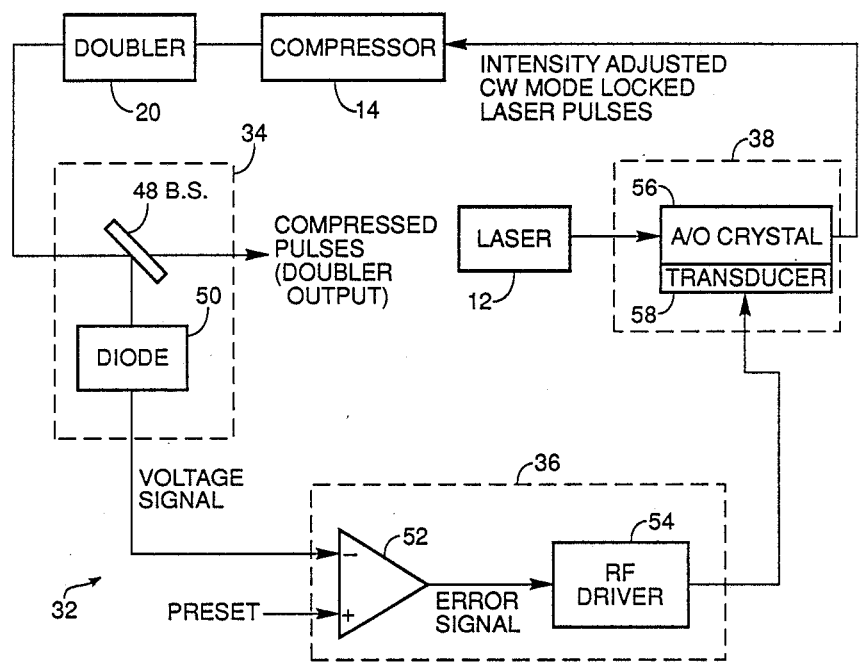
FIG. 2 is a more detailed schematic of the servo system of FIG. 1.

The details of one embodiment of the servo system 32 are shown in FIG. 2. In intensity measurement means 34, an uncoated glass beamsplitter 48 at 45 degrees picks off about 1 mW of the frequency doubled output from the compressor. A silicon photodiode/preamp 50 converts the light intensity to a voltage level which is used in the servo loop (system) 32. The servo loop then generates an error signal by comparing this signal to a preset voltage in comparison means 52 of controller 36. The error signal is input to rf driver 54 to control its output. The servo thus adjusts the amplitude of the radio frequency drive signal from rf driver 54 which is sent to an acousto-optic modulator (intensity adjustment means) 38. The A/0 modulator 38 is formed of an A/0 crystal 56 with a transducer 58 attached thereto. Transducer 58 receives a drive signal from driver 54 which turns modulator 38 on and off. The servo loop has a unit gain frequency of 25 KHz with a roll off of 6 dB/octave. Although an acousto-optic servo is capable of much wider bandwidths, the inclusion of the pulse compressor, with the associated delay in the fiber optic, causes the loop to oscillate with higher loop unit gain frequencies. The acousto-optic modulator provides up to 50% loss when operating at its Bragg angle and the insertion loss of the modulator in the off state is less than 1%.

Figure 3:
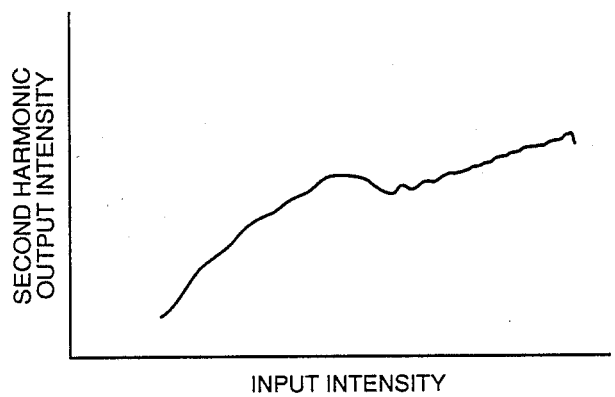
FIG. 3 is a plot of frequency doubled compressor output as a function of input intensity.

The pulse compressor output varies as a function of the input intensity and pulsewidth. A plot of the frequency doubled output from the compressor (20X) as a function of the input intensity is shown in FIG. 3. As the input power increases the output second harmonic reaches a peak, rolls off and then increases slowly.

Figure 4:
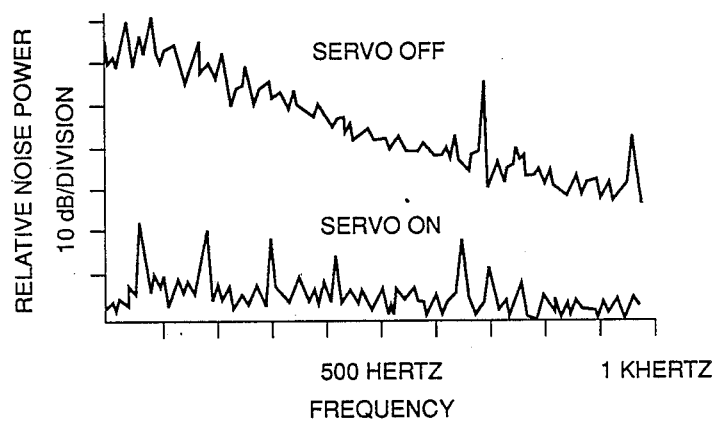
FIG. 4 is a plot of noise power vs. frequency of the second harmonic of the pulse compressor, with the servo on and off.

FIG. 4 contains a plot of the noise power versus frequency of the second harmonic of the pulse compressor. For comparison, the spectrum of the noise is measured with the servo on and the servo off. The servo reduces the noise by nearly 50 dB near DC and has 30 dB of noise suppression at 1 KHz. As an indication of the improvement afforded by the servo the noise of the compressed frequency doubled and stabilized Nd:YAG laser is comparable to an uncompressed and frequency doubled Nd:YAG.

Figure 5:
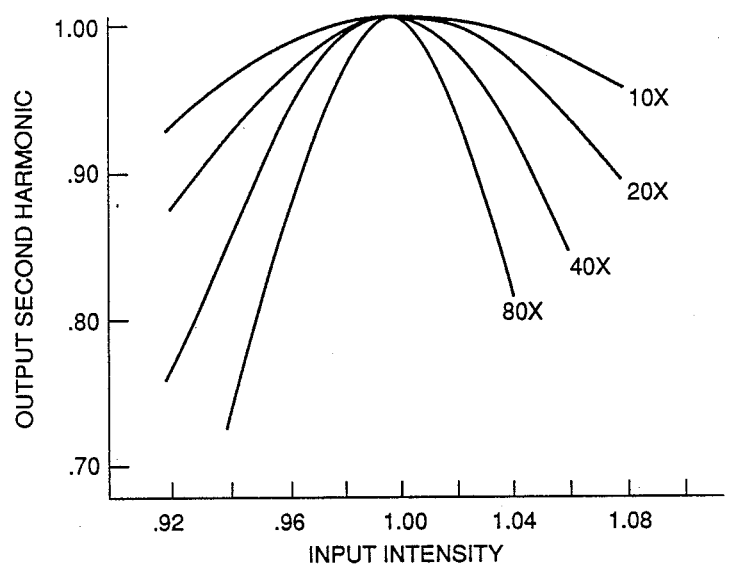
FIG. 5 is a plot of the second harmonic of the compressor output as a function of input intensity for various compression ratios.

To explain the operation of the invention, the second harmonic output as a function of the input intensity for several different compression ratios (with no servo system) is shown in FIG. 5. For high compression ratios the curve is quite steep, e.g. for an 80X compression ratio, a 2% change in the input intensity can cause a 10% change in the frequency doubled output.

Figure 6:
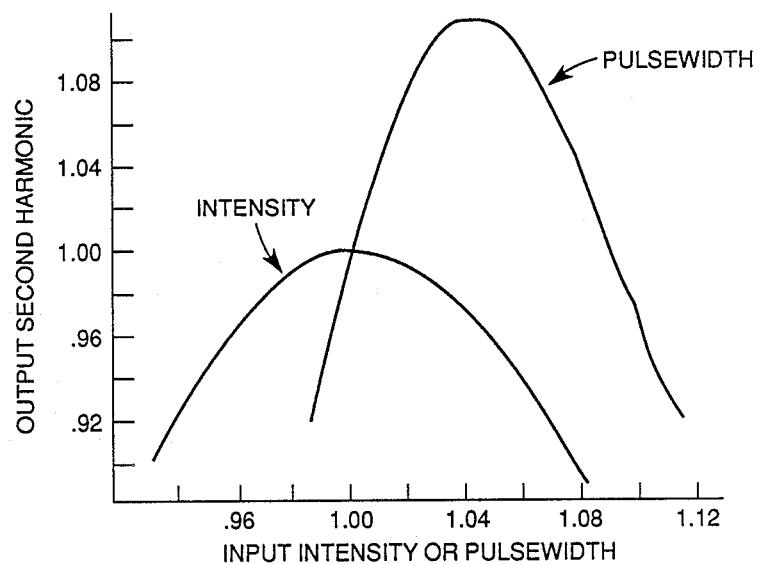
FIG. 6 is a plot of the compressor output second harmonic as a function of input intensity and of pulsewidth (at 20X).

When the intensity of the input pulse is at the optimum value, the output is reasonably insensitive to input intensity fluctuations. Thus an appropriate grating spacing and input intensity can minimize sensitivity to input intensity fluctuations. The dependence of the frequency doubled output power on input intensity and on input pulsewidth is shown in FIG. 6. For a given grating spacing it is not possible to find an input intensity which will simultaneously minimize output sensitivity to both types of fluctuations.

Figure 7:
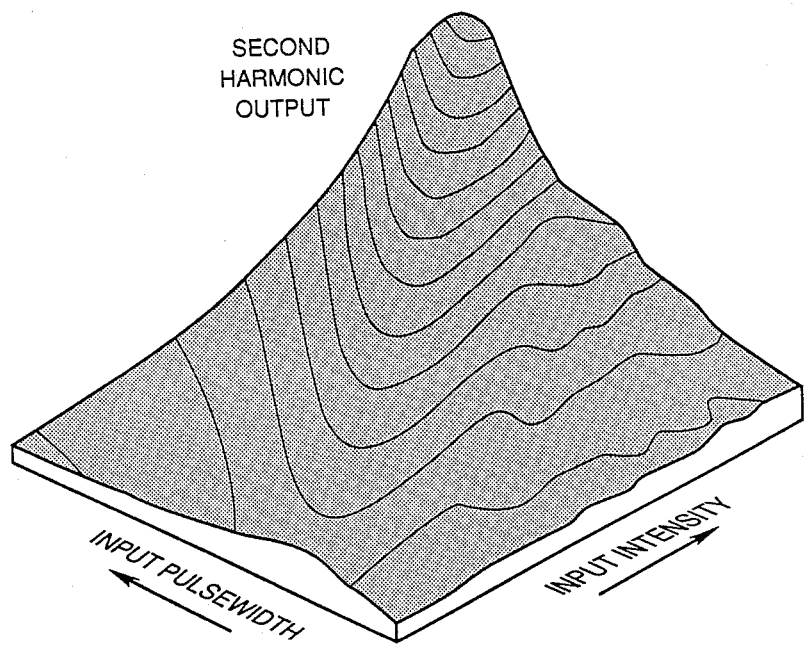
FIG. 7 is a 3-D plot of second harmonic compressor output as a function of both input intensity and pulsewidth.

FIG. 7 is a three dimensional plot showing the variation of the second harmonic output as a function of both input intensity and pulsewidth. The ridge that runs down the middle indicates the values for which the green (frequency doubled) intensity is a maximum. This FIG. illustrates that there is no point which is locally maximum in both variables. Lines of equal output intensity are shown on the surface. The point of insensitivity to a given variable occurs when the contour line is parallel to that axis. For a larger input pulsewidth, optimal compression requires a higher intensity since the frequency chirp of the pulse must match the chirp determined by the grating pair separation. The highest intensity portion of the plot represents compression of long pulsewidth and high intensity pulses, corresponding to a high compression ratio. The ridge is much sharper here which is in agreement with FIG. 5. Finally the low intensity side of the ridge is smooth while the high intensity side is not. These features are due to the shoulders on the pulse that are present at higher input intensities.

Figure 8:
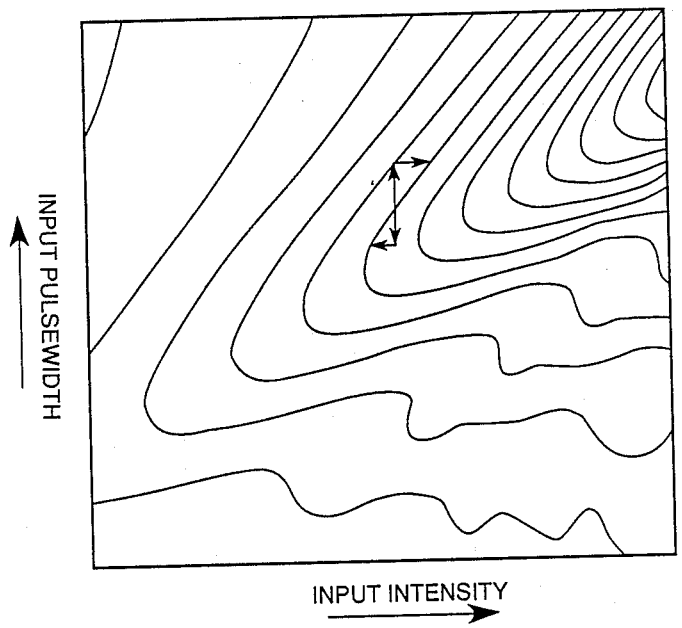
FIG. 8 is a top view of the surface of FIG. 7.

The contour lines in FIG. 7 indicate which values of input pulsewidths and intensities will result in equal values of compressed second harmonic output. A nonfluctuating output results from remaining on a contour line. FIG. 8 shows the top view of the surface of FIG. 7 and includes the contour lines. Input intensity changes can be greatly reduced by using an acousto-optic modulator. If the pulsewidth changes, one can still remain on a contour line by changing the input intensity, as illustrated by the arrows in FIG. 8. An appropriate operating point on the surface is near the peak of the ridge. Thus fluctuations in either the input intensity or pulsewidth can be corrected by changing the input intensity.

One important application of the compressed and frequency doubled Nd:YAG laser is synchronous pumping of a dye laser. In this application any low frequency fluctuations in the pump intensity are passed on directly to the dye laser. The addition of the stabilization scheme described above significantly improves the performance of the compressor pumped dye laser.

Clearly, the fluctuations of the source laser play a key role in the output of a pulse compressor. Large compression ratios place stringent requirements on the intensity and pulsewidth stability of the source laser. Because of this requirement for pump source stability, most of the compressed laser sources to date have been continuous wave and mode-locked.

It is not the intensity fluctuations of the source per se that cause the output fluctuations, but the variation of the chirp that is induced by the fiber. This fluctuation in the chirp will cause a mismatch with the grating pair and produce an incompletely compressed pulse. This effect dominates the fluctuations in peak power.

By the invention, it is possible to correct the effect of both source intensity and pulsewidth fluctuations by modifying only the input intensity. A change in pulsewidth affects the frequency sweep after the fiber. If the pulsewidth increases, the servo will increase the intensity in order to present the appropriate frequency chirp to the dispersive delay line. The resulting compressed output pulse will have the same second harmonic energy and nearly the same pulsewidth.

Changes and modifications in the specifically described embodiments can be carried out without departing from the scope of the invention which is intended to be limited only by the scope of the appended claims.

We claim:

1. Apparatus for stabilizing the frequency doubled output of a frequency doubler optically connected to a pulse compressor which is optically connected to and driven by a cw mode locked laser source producing laser pulses which are passed through the compressor and from the compressor through the frequency doubler, comprising:
   intensity measurement means following the frequency doubler for measuring the intensity of the frequency doubled output and producing an intensity measurement signal related thereto;
   controller means connected to the intensity measurement means for producing a drive signal in response to the intensity measurement signal;
   intensity adjustment means connected to the controller means and to the laser source for adjusting the intensity of the laser pulses from the laser source in response to the drive signal.

2. The apparatus of claim 1 wherein the intensity adjustment means is an acousto-optic shutter.

3. The apparatus of claim 1 wherein the intensity measurement means is a photodiode.

4. A pulse compressed laser system with reduced noise from laser intensity and pulsewidth fluctuations, comprising:
   a cw modelocked laser source producing pulses of a preselected intensity;
   a pulse compressor optically aligned with the laser source for receiving and transmitting laser pulses to produce compressed pulses;
   a frequency doubler optically aligned with the pulse compressor to frequency double the compressed pulses;
   intensity measurement means following the frequency doubler for measuring the intensity of the frequency doubler output and producing an intensity measurement signal related thereto;
   controller means connected to the intensity measurement means for producing a drive signal in response to the intensity measurement signal;
   intensity adjustment means connected to the controller means and to the laser source for adjusting the intensity of the laser pulses from the laser source in response to the drive signal.

5. The laser system of claim 4 wherein the laser source is a Nd:YAG laser.

6. The laser system of claim 4 wherein the pulse compressor is a fiber optic grating compressor comprising a single mode optical fiber whose output is passed through a double pass grating pair.

7. The laser system of claim 4 wherein the doubler is a KTP crystal.

8. The laser system of claim 4 wherein the laser source is a Nd:YAG laser, the pulse compressor is a fiber optic grating compressor comprising a single mode optical fiber whose output is passed through a double pass grating pair, and the doubler is a KTP crystal.

9. The laser system of claim 4 wherein the intensity adjustment means is an acousto-optic shutter.

10. The laser system of claim 4 wherein the intensity measurement means is a photodiode.

11. The laser system of claim 8 wherein the intensity adjustment means is an acousto-optic shutter positioned between the laser source and the pulse compressor.

12. A method of reducing the effects of fluctuations in input intensity and pulsewidth on frequency doubled output pulses from a frequency doubler following an optical pulse compressor, comprising:
    measuring the intensity of frequency doubled output pulses from the frequency doubler following the pulse compressor;
    comparing the measured intensity to a selected intensity to determine a difference;
    adjusting the input intensity of input pulses to the optical pulse compressor in response to the difference to reduce the difference.

13. The method of claim 12 wherein the step of adjusting the input intensity comprises acousto-optically modulating pulses input into the pulse compressor.

14. The method of claim 12 wherein the step of measuring the intensity of frequency doubled output pulses from the frequency doubler following the pulse compressor comprises inputting a portion of the frequency doubled output pulses into a photodiode.

* * * * *